May 13, 1958  C. C. HIGGENS  2,834,433
LUBRICATING SYSTEMS
Filed Jan. 25, 1955
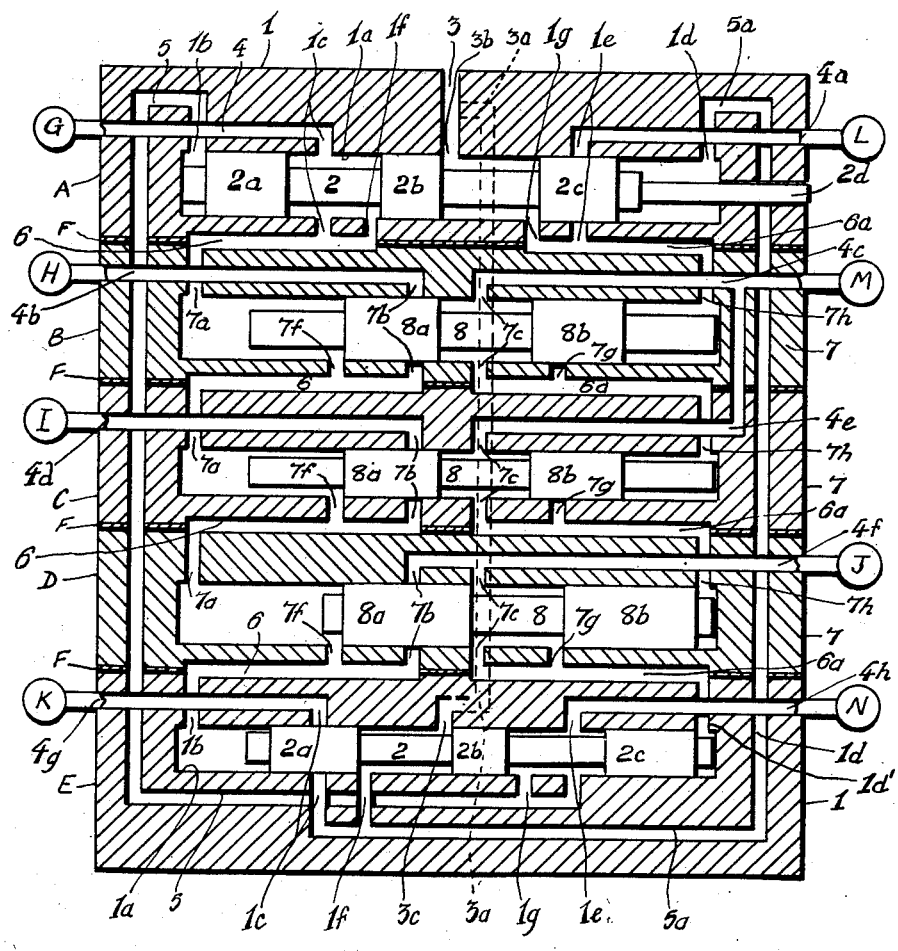
Inventor
Cecil Cyprian Higgens
by Pierce, Scheffler & Parker
atty's United States Patent Office 2,834,433
Patented May 13, 1958

2,834,433

LUBRICATING SYSTEMS

Cecil Cyprian Higgens, West Worthing, England, assignor, by mesne assignments, to Tanway Limited, Barnby Dun, Doncaster, England, a British company Application January 25, 1955, Serial No. 483,962

Claims priority, application Great Britain February 26, 1954

4 Claims. (Cl. 184—7)

This invention relates to lubricating systems, and is particularly concerned with an improved lubricating system of the kind comprising an assemblage of double-acting piston devices adapted to receive lubricant under pressure supplied intermittently or continuously from a single feed line and arranged to coact with ports and passages for operation in series repeatedly in the same sequence but alternately with reversal of movement of the pistons, each piston in its movement in each direction displacing a predetermined quantity of lubricant for delivery under pressure.

Lubricating systems of this kind function to subdivide lubricant supplied under pressure and deliver measured quantities to a number of different lubricating points. The quantity of lubricant required for the effective lubrication at such points may vary considerably, and it is therefore desirable that the system should embody piston devices which permit of the required variation in delivery to the different lubricating points.

The present invention has for its object to provide an improved lubricating system of the kind referred to in which the piston devices are in the form of readily assembled block units of comparatively simple construction and in which variation in the delivery output of the piston devices is obtained with a standard length of bore and port arrangement.

According to the present invention, in a lubricating system of the kind referred to, the assemblage comprises end and intermediate double-acting piston devices, the ends of the intermediate piston or pistons coacting with ports whereby on movement of an intermediate piston by lubricant under pressure applied to the appropriate end, the supply of lubricant is directed to the same end of the next piston in sequence, and the end pistons also control ports connected to the lubricant supply feed line whereby, when the last piston in the series has operated, lubricant under pressure is supplied to the appropriate end of the first piston in the series to effect reversal thereof, whereupon lubricant is supplied from the feed line to the next piston in the series for movement in the same direction as the first piston, and so on throughout the series. Each piston also may control ports through which lubricant delivered from a successively operated piston or pistons is conducted to a lubricating point or points.

The piston of each end piston device may be of the three-land type, the middle land controlling the ports connected to the lubricant supply feed line. Variation in delivery output of the end piston devices is obtainable by using pistons of different diameter and/or by varying the overall length and consequently the stroke of the piston, the lands being suitably modified in axial dimension according to the stroke of the piston so as to coact with the ports communicating with the bore in which the piston operates.

The pistons of the intermediate piston devices may be of the two-land type and variation of delivery output thereof may be obtained by varying the diameter of the pistons and/or varying the overall length and consequently the stroke, the axial dimension of the lands being modified according to the stroke so as to coact with the ports communicating with the bore.

The output from both ends of any one piston device may be conducted to one lubricating point and the output from the same end of two or more successively acting piston devices may be delivered to one lubricating point. The source of supply of lubricant under pressure may be an intermittently operable device, such as a grease-gun, or a continuously operating device, such as a lubricant pump, or may be a delivery point of another lubricating system of the same or different type. Similarly, any delivery point of the present system may be the source of supply for a subsidiary sub-dividing system.

The piston of one of the piston devices may have an extension at one end passing out through a suitable seal to provide an indicator which operates at the completion of each cycle of lubrication.

The invention is hereinafter described, by way of example, with reference to the accompanying diagrammatic drawing which is a sectional view illustrating one embodiment in accordance with the invention.

In carrying the invention into effect according to one embodiment, as illustrated in the accompanying diagrammatic drawing, a lubricating system according to the invention comprises an assemblage of piston devices in the form of block units A, B, C, D, E with interposed gaskets F, which are provided with channels and openings arranged to establish communication between ports and passages of adjacent units, the whole assemblage being held together by means such as bolts or clamps (not shown). The assemblage includes two end units A and E and any number of intermediate units, such as B, C and D.

The end units A or E are similar in construction and in the arrangement of ports. The unit A comprises a block 1 having a bore 1a in which a double-acting piston 2 having three axially spaced lands 2a, 2b, 2c is slidable. A port 1b opening into one end of the bore communicates with a passage 5, and a port 1d at the other end of the bore communicates with a passage 5a. The end lands 2a, 2c of the piston 2 are disposed so that the ports 1b, 1d are always open. The end land 2a controls oppositely disposed ports 1c whereby communication between a passage 4 leading to the lubricating point G and a passage 6 communicating with the same end of the bore of the succeeding unit may be established or shut off. Similarly, the end land 2c controls ports 1e whereby communication between a passage 4a leading to the lubricating point L and a passage 6a may be established or shut off. The middle land 2b controls a port 3b communicating with a passage 3 connected to a supply line for lubricant under pressure, the arrangement being such that in the position shown in the drawing the port 3b is placed in communication with the port 1g, while when the piston 2 moves to the other end of its stroke, the port 3b is placed in communication with the port 1f.

The other end unit E is similar to the unit A but control of the ports 1c by the end land 2a will establish or shut off communication between a passage 4g leading to the lubricating point K and the passage 5a, while the ports 1e controlled by the end land 2c shut off or establish communication between a passage 4h leading to the lubricating point N and the passage 5 before referred to. The middle land 2b controls a port 3c communicating with a branch passage 3a from the feed line passage 3, and the port 1f communicates with the passage 5a and the port 1g with the passage 5.

It is desirable that the lands 2a, 2b, 2c on the piston of end section E should be so proportioned and the ports 1c, 1e so positioned, that when the piston moves from left to right, the port 1e commences to open appreciably in advance of the central port 3c being placed in communication with the port 1f. Similarly, when the piston reverses and moves from right to left, the port 1c should open in advance of the central port 3c being put into communication with the port 1g. The object of this arrangement is to ensure that before the piston of end section A moves there shall be a clear path for the displaced lubricant out through the opposite end section E to the appropriate bearing, thus eliminating any possibility of an hydraulic lock occurring.

Each of the intermediate units B, C, D comprises a block 7 and a double-acting piston 8 slidable in a bore in the block and having two lands 8a, 8b. The land 8a controls a port 7f which, when open, establishes communication through a port 7a with a passage 6 communicating with the ports 1c, 1f of the unit A, and a similar passage 6 communicating with the port 7a of the succeeding unit C. The land 8a also controls oppositely disposed ports 7b whereby communication between a passage 4b leading to the lubricating point H and the passage 6 communicating with the next succeeding unit C is established or shut off. Similarly, the land 8b controls a port 7g which, when open, establishes communication through a port 7h with a passage 6a communicating with the ports 1e, 1g of the first unit A, and a similar passage 6a communicating with the port 7h of the succeeding unit C. The land 8b also controls opposite ports 7c whereby communication between a passage 4c leading to the lubricating point M and the passage 6a leading to the succeeding unit C may be established or shut off.

The unit C is similar to the unit B except that while the ports 7b communicate with the passage 4d leading to the lubricating point I, the ports 7c communicate with the passage 4e which connects with the passage 4c and thence to the lubricating point M.

The unit D also is similar to the unit B except that both ports 7b, 7c communicate with a passage 4f leading to the lubricating point J.

One of the pistons, for instance the piston 2 in unit A, is preferably provided at one end with an extension 2d which passes through a suitable seal in the end of the respective block 1 and by its position indicates the completion of a cycle of operation of the system. Such an indicator may be used to operate a contact for setting into motion an electrical timer of a pump-driven system so that timed cycle operation of the system is obtained. Alternatively, the said contact may be used for providing a remote indication of the operation of either a continuously running or timed cycle system. If desired, similar indicator extensions may be provided on all pistons so that in the event of failure the source of the trouble may be readily ascertained.

The length of the bore in each unit is preferably the same, as shown, and the axial positions of the ports in the end units A and E are identical, and likewise the axial positions of the ports in the intermediate units B, C and D are identical. Variation of the delivery output from each unit may be obtained by utilizing units with bores of different diameter. For example, as shown, the unit A has a bore and piston of larger diameter than the unit E, and the unit B has a bore of larger diameter than the unit C. Furthermore, the stroke of the piston may be varied. For example, in the unit E the piston 2 has a shorter stroke than the piston 2 in the unit A, the axial dimensions of the lands 2a, 2b, 2c being suitably modified so that they coact with the ports in the same manner as the lands of the piston 2 of the unit A. The pistons 8 of the units B and C which are of different diameter, have the same stroke. In the unit D the piston is the same diameter as the piston in the unit B but has a longer stroke, the piston being of shorter overall length and having the lands 8a, 8b suitably increased in length for co-operation with the various ports.

The passages 6, 6a may be formed by suitably disposed slots in the gaskets F.

In operation of the system as shown in the drawing, lubricant under pressure supplied intermittently or continuously from any suitable source is conducted through the passage 3 and branch pipe 3a. As the piston 2 of the unit E is in its right-hand position, the port 3c is open and lubricant flowing through the port 1f and passage 5a has displaced the piston 2 in the unit A to the left, i. e. to the position shown in the drawing in which the port 1g is open. In its movement to the left the piston 2 of unit A displaces lubricant through the port 1b and passage 5 and then through ports 1e and passage 4h to the lubricating point N. As the port 1g of the unit A is open, lubricant under pressure flows through the passage 6a and port 7h into the right-hand end of the bore of the succeeding unit B, whereby the piston 8 therein is moved to the left and displaces a quantity of lubricant through the port 7a, passage 6 and ports 1c to the passage 4 leading to the lubricating point G. On completion of the movement of the piston 8 of the unit B, the port 7g is opened and the lubricant under pressure can then flow through the passage 6a leading to the port 7h in the next unit C with the result that the piston 8 of this unit is moved to the left and displaces lubricant through the port 7a and the passage 6, ports 7b and passage 4b to the lubricating point H. The port 7g of the unit C is now open and lubricant under pressure passes on through the passage 6a and port 7h of the unit D, whereby the piston 8 in the unit D is moved to the left and displaces lubricant through the respective ports 7a and passage 6, ports 7b and passage 4d to the lubricating point I. The port 7g of the unit D is now open and lubricant under pressure passes through the port 1d' into the respective end of the bore 1a in the unit E, whereby the piston 2 in this unit is displaced to the left. In this case the quantity of lubricant displaced by the piston 2 passes through the port 1b, passage 6 and ports 7b of the unit D to the passage 4f leading to the lubricating point J.

With the piston 2 of the unit E moved over to the left, the port 3c is placed in communication with the port 1g so that lubricant under pressure from the passage 3a flows through the passage 5 and through the port 1b to the left-hand end of the bore 1a of the unit A, whereby the piston 2 of this unit is moved to the right and displaces lubricant through the port 1d and passage 5a, ports 1c and passage 4g to the lubricating point K. When the piston 2 of the unit A has moved to the right-hand limit of its travel, the port 1f is placed in communication with the port 3b so that lubricant under pressure will flow through the port 7a to the left-hand end of the bore in the unit B, whereby the piston 8 therein is moved to the right and displaces lubricant through the port 7h, passage 6a, ports 1e of unit A and passage 4a to the lubricating point L. The port 7f of the unit B is now open and lubricant under pressure can flow through the passage 6 to the port 7a of the unit C, whereby the piston 8 of the unit C is moved to the right and displaces lubricant through the port 7h, passage 6a, ports 7c of the unit B and passage 4c to the lubricating point M. The port 7f of the unit C is now open and lubricant flows through the passage 6 and port 7a to the left-hand end of the bore of the unit D, whereby the piston 8 therein is moved to the right and displaces lubricant through the port 7h, passage 6a, ports 7c of unit C and passage 4e to the lubricating point M. The port 7f of the unit D is now open and lubricant under pressure passes through the passage 6 and port 1b of the unit E, whereby the piston 2 therein is moved to the right and displaces lubricant through the port 1d', passage 6a and ports 7c and passage 4f to the lubricating point J.

When the piston 2 of the unit E has been moved to the right, the port 3c communicating with the passage 3a is again opened for supply of lubricant under pressure through the port 1f, passage 5a, port 1d to the right-hand end of the bore 1a of the unit A, whereby the piston 2 of the unit A is moved to the left to displace lubricant through the passage 5, ports 1e and passage 4h to the lubricating point N, thus completing a cycle.

It will be understood that the invention is not limited to the particular embodiment hereinbefore described and that the number of intermediate units and the connection of the delivery ports of the units to various lubricating points may be modified as desired to provide for variation in the frequency or quantity of lubricant supplied to any particular point or points.

What I claim is:

1. A lubricating system for delivering quantities of a lubricant to various lubricating points comprising end blocks containing pistons of the three-land double-acting type, blocks intermediate said end blocks and containing pistons of the two-land double-acting type, passages in all of said blocks controlled by the pistons therein for delivering the lubricant to a plurality of lubricating points, and means for operating said pistons successively in series from a first end block through the intermediate blocks to the last end block, said operating means comprising passages in said intermediate blocks controlled by the lands of the pistons therein whereby on movement of an intermediate piston by lubricant under pressure applied to one end thereof, the supply of lubricant is directed from said end to the same end of the next piston in sequence, passages in said end blocks controlled by the middle lands of said end pistons, a lubricant feed line connected solely to said passages controlled by said middle lands, and communicating passages arranged in said blocks so that when the last piston in the series is operated, lubricant under pressure is directed under the control of the middle land of the last piston to the appropriate end of the first piston in series to effect reversal thereof, whereupon lubricant is directed from the feed line under the control of the middle land of the first piston to the appropriate end of the next piston to effect reversal thereof, and so on throughout the series.

2. A lubricating system as defined in claim 1, wherein variation in delivery output of the end blocks is obtained by varying the overall length and consequently the stroke of the pistons therein, the lands of said pistons being suitably modified in axial dimension according to the stroke of the piston so as to coact with the ports communicating with the bore in which the piston operates.

3. A lubricating system as defined in claim 1, wherein variation of delivery output of the intermediate blocks is obtained by varying the overall length and consequently the stroke of the pistons, the axial dimension of the lands of the pistons being modified according to the stroke so as to coact with the ports communicating with the bore.

4. A lubricating system as defined in claim 1, wherein the blocks are assembled with gaskets interposed therebetween, said gaskets having channels or openings therein to provide communication between corresponding ports or passages of adjacent blocks.

References Cited in the file of this patent

UNITED STATES PATENTS

| | | |
|---|---|---|
| 2,146,424 | Dirkes | Feb. 7, 1939 |
| 2,183,986 | Corey | Dec. 19, 1939 |
| 2,622,697 | Higgens | Dec. 23, 1952 |

FOREIGN PATENTS

| | | |
|---|---|---|
| 628,481 | Great Britain | Aug. 30, 1949 |